United States Patent
Lin et al.

(10) Patent No.: US 10,185,447 B2
(45) Date of Patent: Jan. 22, 2019

(54) TOUCH SENSING DEVICE WITH NOISE EFFECT REDUCTION

(71) Applicant: AU Optronics Corporation, Hsin-Chu (TW)

(72) Inventors: Feng-Sheng Lin, Hsin-Chu (TW); Chun-Chi Lai, Hsin-Chu (TW); Tsang-Hong Wang, Hsin-Chu (TW)

(73) Assignee: AU OPTRONICS CORPORATION, Hsin-chu (TW)

( * ) Notice: Subject to any disclaimer, the term of this patent is extended or adjusted under 35 U.S.C. 154(b) by 165 days.

(21) Appl. No.: 14/876,132

(22) Filed: Oct. 6, 2015

(65) Prior Publication Data

US 2016/0313845 A1    Oct. 27, 2016

(30) Foreign Application Priority Data

Apr. 22, 2015 (TW) .............................. 104112904 A

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ................................ G06F 3/044; G06F 3/0418
See application file for complete search history.

(56) References Cited

U.S. PATENT DOCUMENTS

| | | | |
|---|---|---|---|
| 2010/0060610 A1* | 3/2010 | Wu | G06F 3/044 345/174 |
| 2010/0079401 A1* | 4/2010 | Staton | G06F 3/0418 345/174 |
| 2010/0079402 A1 | 4/2010 | Grunthaner et al. | |
| 2011/0115729 A1 | 5/2011 | Kremin et al. | |
| 2011/0216033 A1* | 9/2011 | Mamba | G06F 3/0418 345/174 |
| 2012/0146920 A1 | 6/2012 | Lin et al. | |
| 2012/0200524 A1 | 8/2012 | Vallis et al. | |
| 2014/0022188 A1* | 1/2014 | Ahn | G06F 3/0416 345/173 |
| 2015/0153883 A1* | 6/2015 | Goo | G06F 3/0412 345/173 |
| 2015/0205438 A1 | 7/2015 | Kremin et al. | |
| 2016/0092028 A1 | 3/2016 | Vallis et al. | |

FOREIGN PATENT DOCUMENTS

| | | |
|---|---|---|
| CN | 102301320 | 12/2011 |
| CN | 102725715 | 10/2012 |
| CN | 102934061 | 2/2013 |
| CN | 103543870 | 1/2014 |

* cited by examiner

*Primary Examiner* — Jonathan Blancha
(74) *Attorney, Agent, or Firm* — WPAT, PC

(57) ABSTRACT

A touch sensing device includes a base panel, a plurality of receiving channels, at least one noise listening channel and at least one processing unit. The receiving channels are disposed on the base board in parallel. The at least one noise listening channel and the receiving channels are disposed on the base board in parallel. The processing unit is configured to generate touching sensing data according to a sensing signal outputted by a corresponding receiving channel of the plurality of receiving channels and a noise listening signal outputted by the at least one noise listening channel.

8 Claims, 8 Drawing Sheets

TOUCH SENSING DEVICE WITH NOISE EFFECT REDUCTION

RELATED APPLICATIONS

This application claims priority to Taiwan Application Serial Number 104112904, filed Apr. 22, 2015, which is herein incorporated by reference.

BACKGROUND

Field of Invention

The present invention relates to a touch sensing device. More particularly, the present invention relates to a touch sensing device with noise effect reduction.

Description of Related Art

With the improvement of information technology, the application of touch panels is becoming increasingly prevalent. More and more electrical products have touch panels (e.g., smart phone, tablet and laptop computer), making the electronic products more intuitive and convenient for users.

However, when the present liquid crystal display touch panel or LED touch panel drives the pixel, it generates noise which affects the linearity and the accuracy of the touch sensing function of the touch panel. For example, an organic light-emitting diode (OLED) touch panel transmits extremely large noise to the touch sensing device when driving the OLED pixels. Therefore, the linearity and the accuracy will decrease.

SUMMARY

One aspect of the present disclosure provides a touch sensing device. The touch sensing device includes a plurality of receiving channels, at least one noise listening channel and at least one processing unit. The receiving channels are disposed on a base board in parallel. The at least one noise listening channel has a rectangular shape, and the at least one noise listening channel and the receiving channels are disposed on the base board in parallel. The processing unit is configured to generate touch sensing data according to a sensing signal outputted by a corresponding receiving channel of the receiving channels and a noise listening signal outputted by the at least one noise listening channel.

Another aspect of the present disclosure provides a touch sensing device. The touch sensing device includes at least one first receiving channel, at least one second receiving channel and at least one processing unit. The at least one first receiving channel is configured to output a first sensing signal and a first noise listening signal alternately. The at least one second receiving channel is configured to output a second sensing signal and a second noise listening signal alternately. The at least one processing unit is configured to generate touch sensing data according to the first sensing signal, the second sensing signal, the first noise listening signal and the second noise listening signal.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
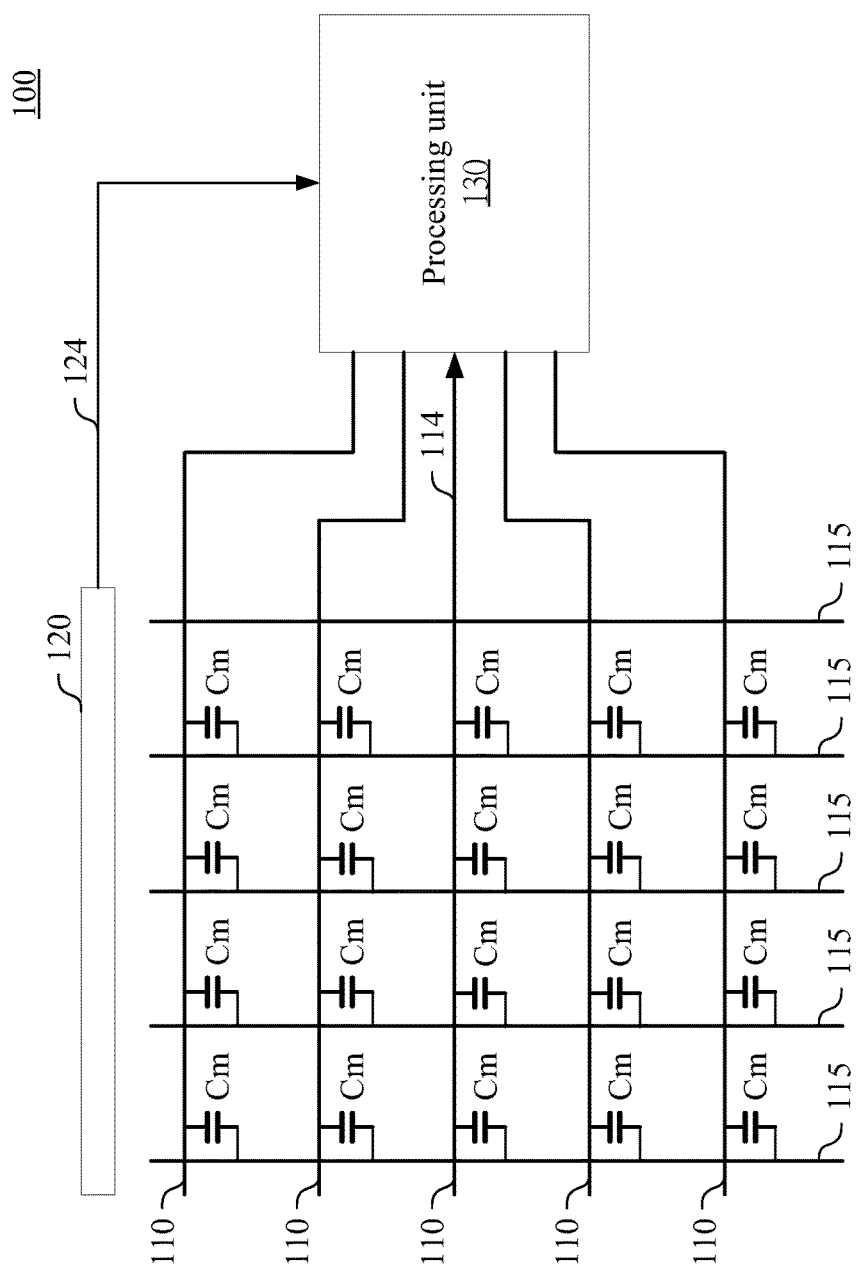
FIG. 1 is a schematic diagram illustrating a touch sensing device in accordance with one embodiment of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In this document, the term "coupled" may also be termed as "electrically coupled", and the term "connected" may be termed as "electrically connected". "Coupled" and "connected" may also be used to indicate that two or more elements cooperate or interact with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Referring to FIG. 1, FIG. 1 is a schematic diagram illustrating a touch sensing device 100 in accordance with one embodiment of the present disclosure. The touch sensing device 100 is a touch panel but not limited thereto. The touch sensing device 100 includes a plurality of receiving channels 110, at least one noise listening channel 120 and at least one processing unit 130. In one embodiment, the processing unit 130 is a chip. In another embodiment, the touch sensing device 100 includes at least one processor and a memory. The processing unit 130 is stored in the memory and executes its functions by the processor.

In one embodiment, the material of the noise listening channel 120 is metal or indium tin oxide (ITO). In this embodiment, the touch sensing device 100 further optionally includes a plurality of transmitting channels 115 and a plurality of coupling capacitors Cm. Each of the receiving channels 110 is electrically connected to a respective one of the transmitting channels 115 via one of the coupling capacitors Cm.

It is noted that, the number of the receiving channels 110 is not limited to five as shown in FIG. 1. Practically, the number of the receiving channels 110 can be more than five. Those skilled in the art can choose the number of the receiving channels 110 according to the requirements of practical applications.

In one embodiment, the receiving channels 110 are disposed on a base board (not shown) in parallel, and the noise listening channel 120 has a rectangular shape (as shown in FIG. 1). The noise listening channel 120 and the receiving channels 110 are disposed on the base board in parallel.

The processing unit 130 is configured to generate touch sensing data according to a sensing signal 114 outputted by a corresponding receiving channel 110 and a noise listening signal 124 outputted by the at least one noise listening channel 120. In one embodiment, the touch sensing device 100 is a touch panel. The noise listening channel 120 is configured to receive noise generated by the touch panel when the pixel is, for example, illuminating or being driven, and the noise listening signal 124 includes the component of noise. The processing unit 130 is configured to subtract the noise listening signal 124 from the sensing signal 114 for removing the corresponding noise component from the sensing signal 114, so as to generate the touch sensing data, but not limited thereto. According to one embodiment of the present disclosure, the noise listening channel 120 and the projection area of the transmitting channel 115 on the base board are overlapped.

In the above embodiment, the noise listening channel 120 and the receiving channels 110 are disposed on the base board in parallel, so that the noise listening signal 124 outputted by the noise listening channel 120 is more close to the noise received by the receiving channels 110. Therefore, the touch sensing data generated by the processing unit 130 is more accurate.

In another embodiment, the touch sensing device 100 further includes a display panel (not shown). The display panel has data lines in parallel and pixel units disposed thereon. The data lines are configured to a provide data voltage for the pixel units, and the direction of the at least one noise listening channel 120 and the direction of the data lines are perpendicular. According to one embodiment of the present disclosure, the noise listening channel 120 and the projection area of the data lines on the base board are overlapped.

In the embodiment, the direction of the noise listening channel 120 is perpendicular to the direction of the data lines, so as to equalize the noise generated by the data lines for the noise listening channel 120 when the data lines provide the data voltage. Thus the noise listening signal 124 outputted from the noise listening channel 120 is more close to the noise received by the receiving channel 110. Therefore, the touch sensing data generated by the processing unit 130 is more accurate.

Figure 2:
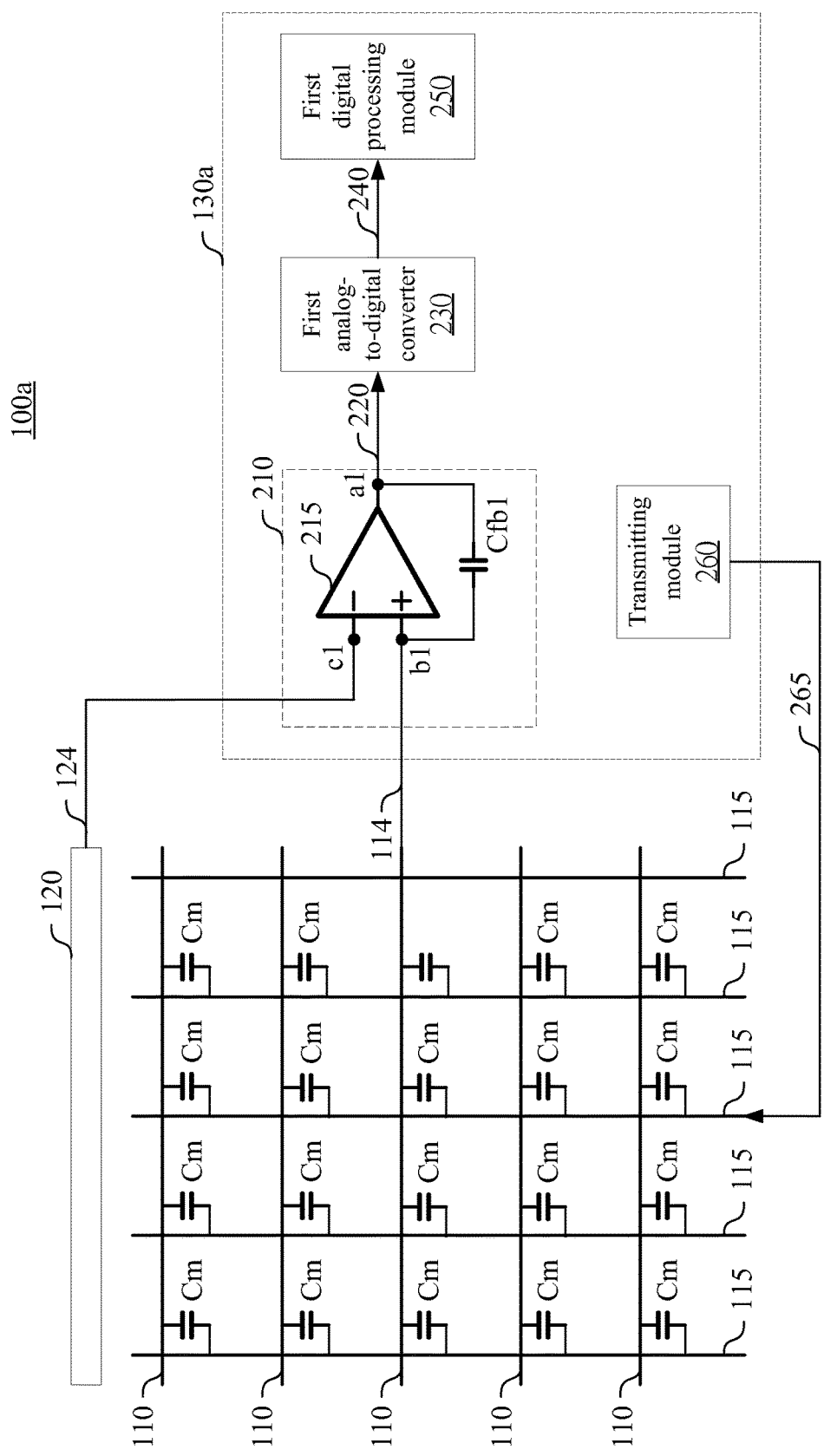
FIG. 2 is a schematic diagram illustrating a touch sensing device in accordance with one embodiment of the present disclosure.

Referring to FIG. 2, FIG. 2 is a schematic diagram illustrating a touch sensing device 100a in accordance with one embodiment of the present disclosure. In this embodiment, a processing unit 130a further includes a transmitting module 260. The transmitting module 260 is configured to transmit a scanning signal 265 to a corresponding transmitting channel of the transmitting channels 115. A corresponding receiving channel of the receiving channels 110 outputs the sensing signal 114 to the processing unit 130a after the scanning signal 265 is coupled via a corresponding coupling capacitor of the coupling capacitors Cm. Therefore, the touch sensing device 100a may sense a touch behavior of the users.

Figure 2A:
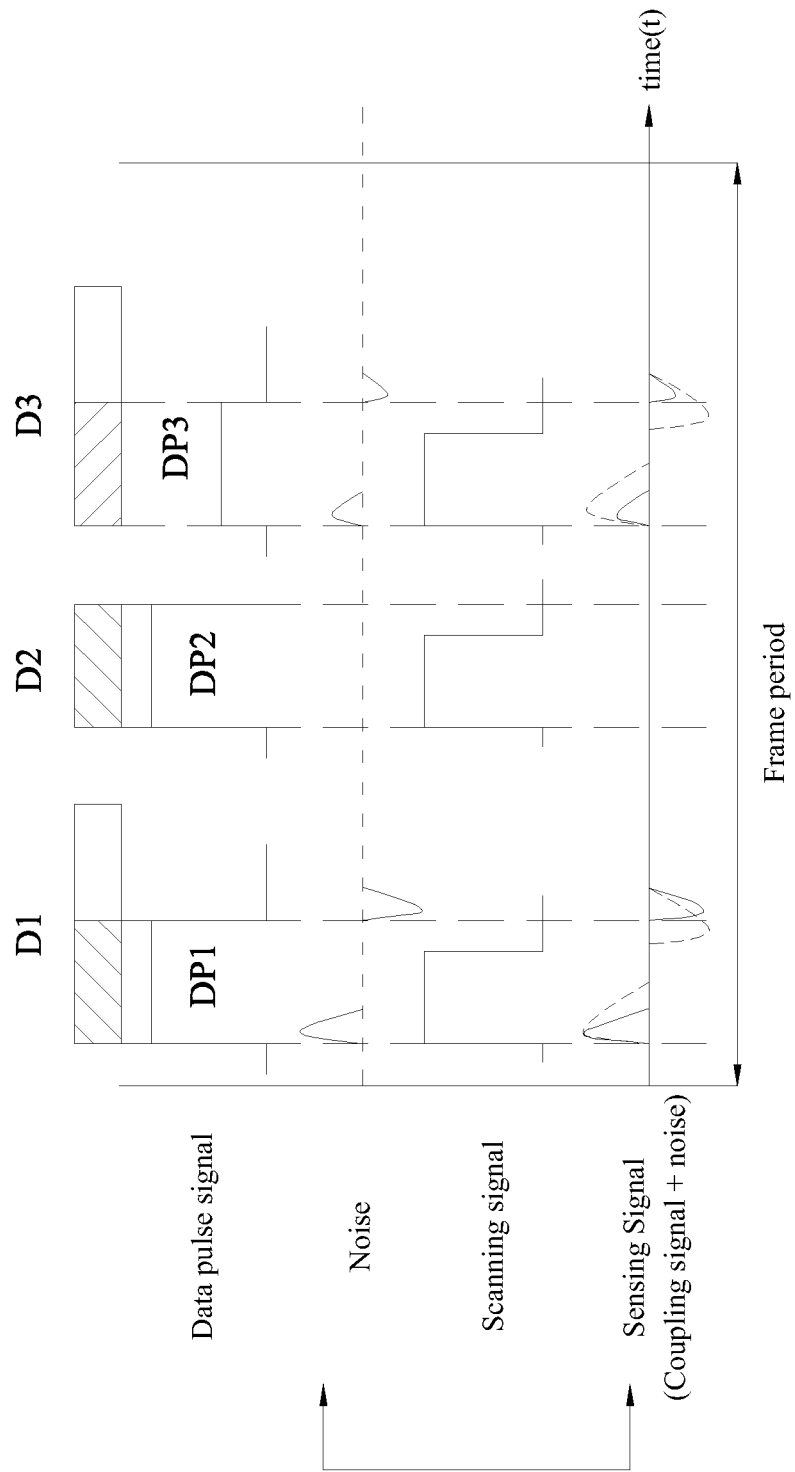
FIG. 2A is a timing diagram illustrating the transmitting signal of the touch sensing device in FIG. 2 in accordance with one embodiment of the present disclosure.

FIG. 2A is a timing diagram illustrating the transmitting signal of the touch sensing device 100a in FIG. 2 in accordance with one embodiment of the present disclosure. As shown in FIGS. 2 and 2A, in some embodiments, display data D1, D2, D3 or their combinations are transmitted to the pixel units via the data lines in a frame period, in which the display data D1, D2, D3 corresponds to data pulse signals DP1, DP2, DP3 respectively. The data pulse signals DP1, DP2, DP3 corresponds to the scanning signal 265 of the transmitting channels 115 respectively, and the enable durations of the scanning signal 265 are in the enable durations of data pulse signals DP1, DP2, DP3 respectively.

Taking the corresponding scanning signal 265 of the data pulse signal DP1 for example, the scanning signal 265 is coupled to the corresponding receiving channels 110 via the corresponding coupling capacitor Cm. Therefore, the sensing signal 114 transmitted through the receiving channels 110 includes the signal received from the receiving channels 110 that is coupled to the scanning signal 265 via the coupling capacitor Cm, and the noise caused by data generation and coupled to the receiving channels 110. At this time, the processing unit 130a subtracts the noise listening signal 124 (e.g., noise) of the noise listening channel 120 from the sensing signal 114 so as to remove the corresponding noise component from the sensing signal 114.

Similarly, the corresponding processes of the data pulse signals DP2 and DP3 are similar to the data pulse signal DP1, and thus are not repeated herein.

It is noted that, the relations between the scanning signal 265 and the data pulse signals DP1, DP2 or DP3 are not limited to above mention, those skilled in the art can adjust the design according to requirements of practical applications.

In one embodiment, the transmitting module 260 is a chip. In another embodiment, the touch sensing device 100a includes at least one processor and a memory. The transmitting module 260 is stored in the memory and executed its function by the processor.

In one embodiment, the at least one processing unit 130a further includes a first receiving module 210. The first receiving module 210 is electrically connected to aforesaid corresponding receiving channel of the receiving channels 110 and the at least one noise listening channel 120.

In another embodiment, the first receiving module 210 is configured to output a first analog signal 220 according to the sensing signal 114 and the noise listening signal 124. The at least one processing unit 130a further includes a first analog-to-digital converter 230 and a first digital processing module 250. In one embodiment, the first analog-to-digital converter 230 and the first digital processing module 250 are chips. In another embodiment, the touch sensing device 110a includes at last one processor and a memory. The first analog-to-digital converter 230 and the first digital processing module 250 are stored in the memory and executed their functions by the processor.

The first analog-to-digital converter 230 is electrically connected to the first receiving module 210. The first analog-to-digital converter 230 is configured to convert the first analog signal 220 into a first digital signal 240. The first digital processing module 250 is electrically connected to the first analog-to-digital converter 230. The first digital processing module 250 is configured to generate the touch sensing data according to the first digital signal 240.

In one embodiment, the first receiving module 210 includes a first differential amplifier 215 and a feedback capacitor Cfb1. The differential amplifier 215 includes an output terminal a1, a first input terminal b1 and a second input terminal c1. The output terminal a1 of the first differential amplifier 215 is electrically connected to a first terminal of the first feedback capacitor Cfb1 to output the first analog signal 220. The first input terminal b1 of the first differential amplifier 215 is electrically connected to a second terminal of the first feedback capacitor Cfb1 and the corresponding receiving channel to receive the sensing signal 114. The second input terminal c1 of the first differential amplifier 215 is electrically connected to the at least one noise listening channel 120 to receive the noise listening signal 124.

In the above embodiments, the at least one processing unit 130a uses the noise listening signal 124 to filter out the corresponding noise of the sensing signal 114 and to output the first analog signal 220 by means of the first differential amplifier 215 and the first feedback capacitor Cfb1. Therefore, the touch sensing data generated by the processing unit 130a is more accurate.

Figure 3:
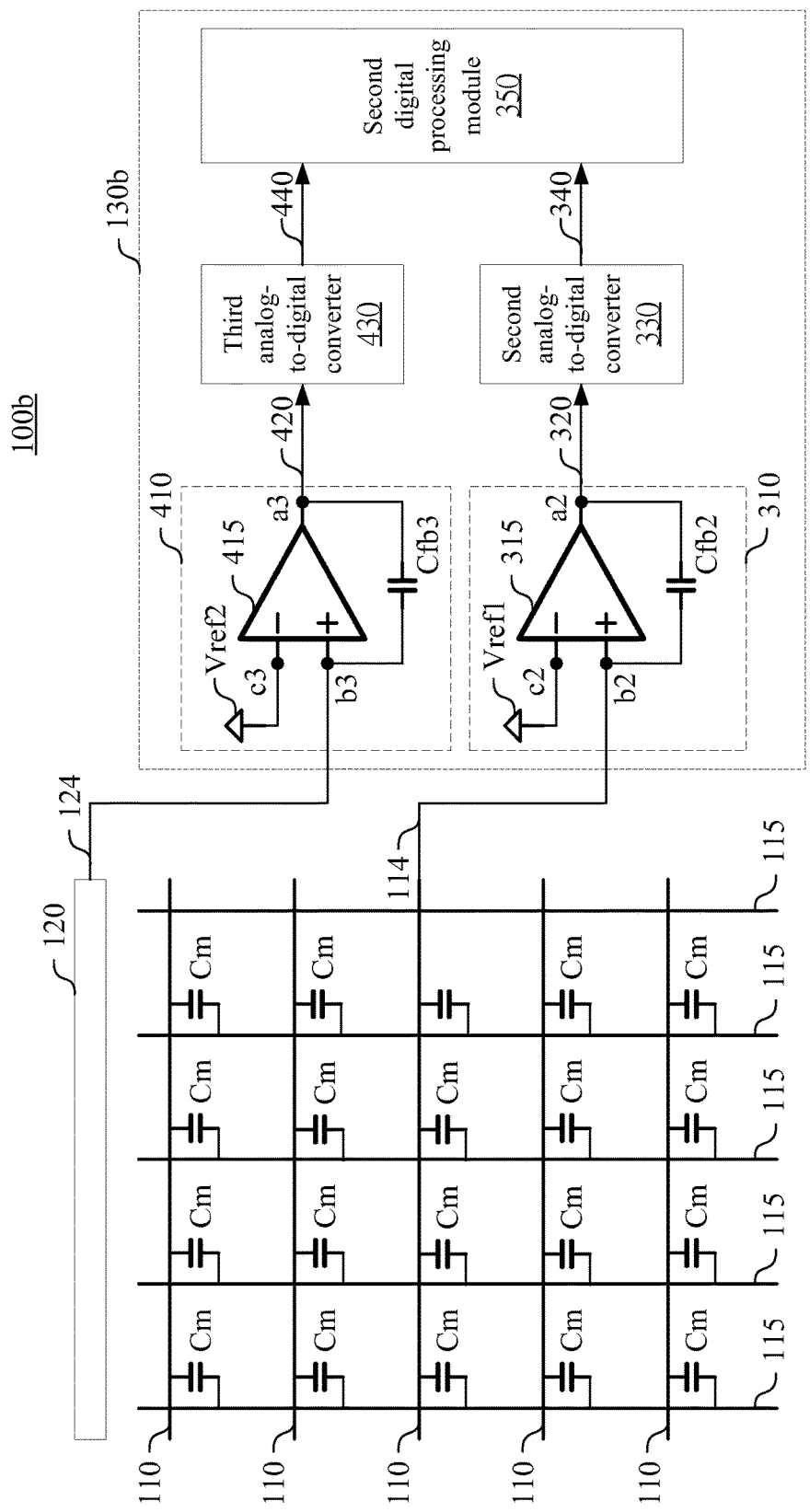
FIG. 3 is a schematic diagram illustrating a touch sensing device in accordance with one embodiment of the present disclosure.

Referring to FIG. 3, FIG. 3 is a schematic diagram illustrating a touch sensing device 100b in accordance with one embodiment of the present disclosure. Compared with the touch sensing device 100 in FIG. 1, in this embodiment, at least one processing unit 130b further includes a second receiving module 310 and a third receiving module 410. The second receiving module 310 is electrically connected to the corresponding receiving channel. The second receiving module 310 is configured to output a second analog signal 320 according to the sensing signal 114. The third receiving module 410 is electrically connected to the at least one noise listening channel 120. The third receiving module 410 is configured to output a third analog signal 420 according to the noise listening signal 124.

In one embodiment, the at least one processing unit 130b further includes a second analog-to-digital converter 330, a third analog-to-digital converter 430 and a second digital processing module 350. In one embodiment, the second analog-to-digital converter 330, the third analog-to-digital converter 430 and the second digital processing module 350 are chips. In another embodiment, the touch sensing device 100b includes at least one processor and a memory. The second analog-to-digital converter 330, the third analog-to-digital converter 430 and the second digital processing module 350 are stored in the memory and executed their functions by the processor.

The second analog-to-digital converter 350 is electrically connected to the second receiving module 310. The second analog-to-digital converter 330 is configured to convert the second analog signal 320 into a second digital signal 340. The third analog-to-digital converter 430 is electrically connected to the second receiving module 410. The second analog-to-digital converter 430 is configured to convert the second analog signal 420 into a second digital signal 440.

The second digital processing module 350 is electrically connected to the second analog-to-digital converter 330 and the third analog-to-digital converter 430. The second digital processing module 350 is configured to generate the touch sensing data according to the second digital signal 340 and the third digital signal 440.

In one embodiment, the second digital processing module 350 subtracts the third digital signal 440 from the second digital signal 340 so as to remove the corresponding noise component from the second digital signal 340 and to generate the touch sensing data, but not limited thereto.

In another embodiment, the second receiving module 310 includes a second differential amplifier 315 and a second feedback capacitor Cfb2. The output a2 of the second differential amplifier 315 is electrically connected to the first terminal of the second feedback capacitor Cfb2 to output the second analog signal 320. The first input terminal b2 of the second differential amplifier 315 is electrically connected to the second terminal of the second feedback capacitor Cfb2 and the corresponding receiving channel to receive the sensing signal 114. The second input terminal c2 of the second differential amplifier 315 is electrically connected to a reference voltage source Vref1.

The third receiving module 410 includes a third differential amplifier 415 and a third feedback capacitor Cfb3. The output terminal a3 of the third differential 415 is electrically connected to the first terminal of the third feedback capacitor Cfb3 to output the third analog signal 420. The first terminal b3 of the third differential amplifier 415 is electrically connected to the second terminal of the third feedback capacitor Cfb3 and the at least one noise listening channel 120 to receive the noise listening signal 124. The second input terminal c3 of the third differential amplifier 415 is electrically connected to a reference voltage source Vref2.

Figure 4:
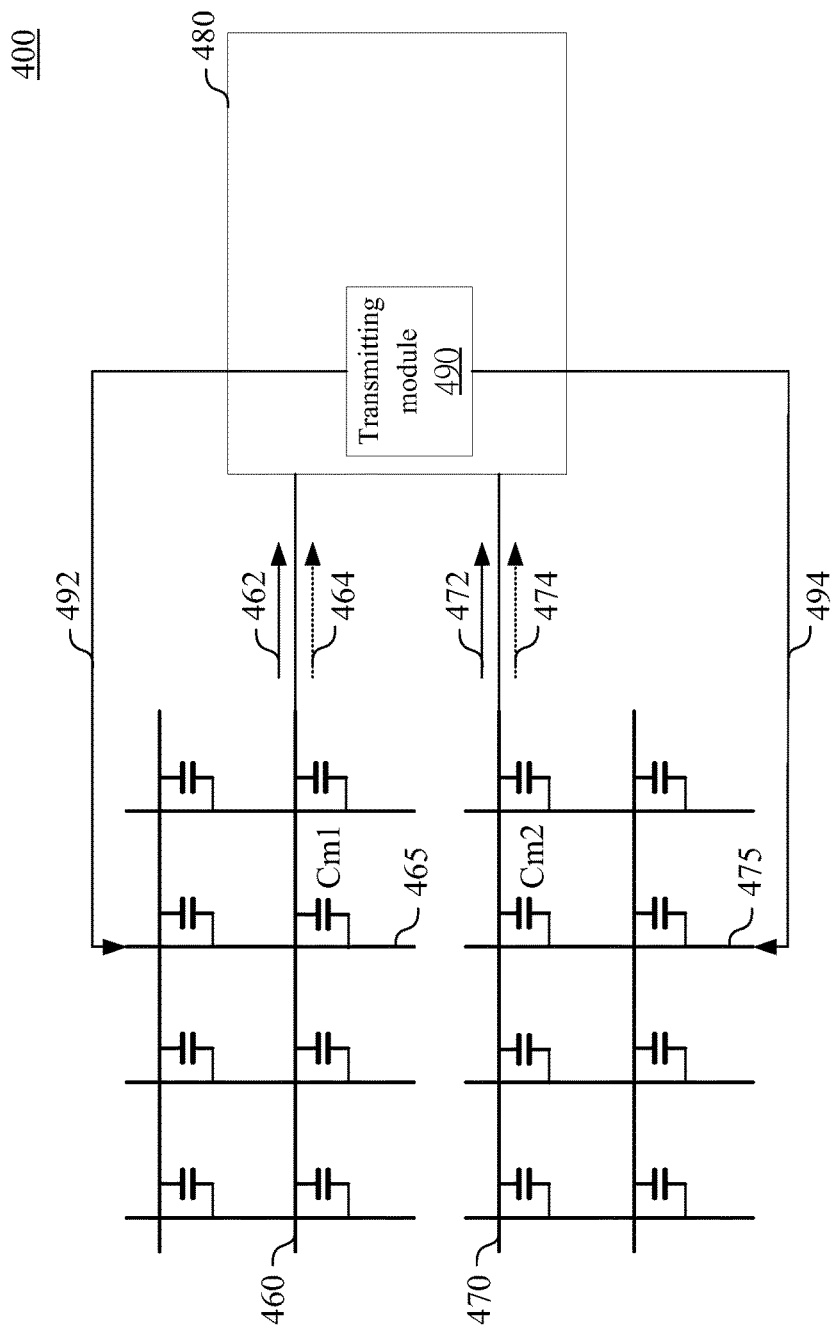
FIG. 4 is a schematic diagram illustrating a touch sensing device in accordance with one embodiment of the present disclosure.

Referring to FIG. 4, FIG. 4 is a schematic diagram illustrating a touch sensing device 400 in accordance with one embodiment of the present disclosure. The touch sensing device 400 includes at least one first receiving channel 460, at least one second receiving channel 470 and at least one processing unit 480. In one embodiment, the processing unit 480 is a chip. In another embodiment, the touch sensing device 400 includes at least one processor and a memory. The processing unit 480 is stored in the memory and executed its function by the processor.

The at least one first receiving channel 460 is configured to output a first sensing signal 462 and a first noise listening signal 464 alternately. The at least one second receiving channel 470 is configured to output a second sensing signal 472 and a second noise listening signal 474 alternately. The at least one processing unit 480 is configured to generate touch sensing data (not shown) according to the first sensing signal 462, the second sensing signal 472, the first noise listening signal 464 and the second noise listening signal 474.

In one embodiment, the touch sensing device 400 includes a base board (not shown), in which the at least one first receiving channel 460 is disposed on the upper part of the base board, and the at least one second receiving channel 470 is disposed on the lower part of the base board, but not limited thereto.

It is noted that, the number of the first receiving channel 460 and the second receiving channel are not limited to two as shown in FIG. 4. Practically, the number of the first receiving channel 460 and the second receiving channel 470 can be much more than two. Those skilled in the art can dispose the number of the first receiving channel 460 and the second receiving channel 470 according to the requirements of practical applications.

Figure 4A:
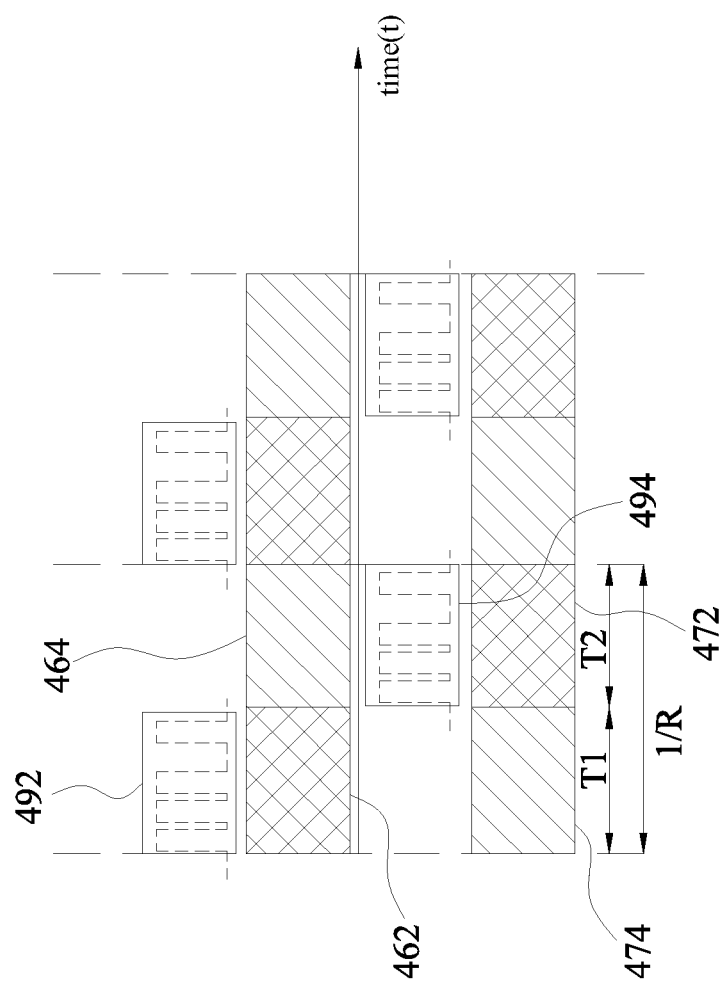
FIG. 4A is a timing diagram illustrating the transmitting signal of the touch sensing device in FIG. 4 in accordance with one embodiment of the present disclosure.

FIG. 4A is a timing diagram illustrating the transmitting signal of the touch sensing device 400 in FIG. 4 in accordance with one embodiment of the present disclosure. As shown in FIGS. 4 and 4A, in one embodiment, the at least one second receiving channel 470 outputs the second noise listening signal 472 while the at least one first receiving channel 460 outputs the first sensing signal 462. The at least one first receiving channel 460 outputs the first noise listening signal 464 while the second receiving channel 470 outputs the second noise listening signal 472. In other words, the second receiving channel 470 is a noise listening channel while the at least one first receiving channel 460 senses the touch behavior of the users. At this time, the at least one processing unit 480 subtracts the second noise listening signal 474 being output by the at least one second receiving channel 470 from the first sensing signal 462 output by the first receiving channel 460. Therefore, the at least one processing unit 480 removes corresponding the noise component from the first sensing signal 462 so as to generate the touch sensing data, but is not limited thereto.

Contrarily, the at least one first receiving channel 460 is a noise listening channel while the at least one second receiving channel 470 is configured to sense the touch behavior of the users. At this time, the at least one processing unit 480 subtracts the first noise listening signal 464 being output by the at least one first receiving channel 460 from the second sensing signal 472 outputted by the second receiving channel 470. Therefore, the at least one processing unit 480 removes the corresponding noise component from the second sensing signal 472 so as to generate the touch sensing data, but is not limited thereto.

In one embodiment, as shown in FIG. 4, the touch sensing device 400 further includes at least one first transmitting channel 465, at least one second transmitting channel 475, at least one first coupling capacitor Cm1 and at least one second coupling capacitor Cm2. In which the at least one first transmitting channel 465 is electrically connected to the at least one first receiving channel 460 via the at least one first coupling capacitor Cm1. The at least one second transmitting channel 475 is electrically connected to the at least one second receiving channel 470 via the at least one second coupling capacitor Cm2. The at least one first transmitting channel 465 and the at least one second transmitting channel 475 are spatially separated or not electrically connected according to one embodiment.

In one embodiment, the at least one processing unit 480 further includes a transmitting module 490. In one embodiment, the transmitting module 490 is a chip. In another embodiment, the touch sensing device 400 includes at least one processor and a memory. The transmitting module 490 is stored in the memory and executed its function by the processor.

The transmitting module 490 is configured to transmit a first scanning signal 492 to the at least one first transmitting channel 465 and to transmit a second scanning signal 475 to the at least one second transmitting channel 475. In operation, as shown in FIGS. 4 and 4A, the first scanning signal 492 is coupled to the first receiving channel 460 via the first coupling capacitor Cm1 to make the first receiving channel 460 output the corresponding first sensing signal 462 to the processing unit 480. Secondly, the second scanning signal 494 is coupled to the second receiving channel 470 via the second coupling capacitor Cm2 so as to make the second receiving channel 470 output the corresponding second sensing signal 472 to the processing unit 480. Therefore, the touch sensing device 400 may sense the touch behavior of the users.

In one embodiment, the transmitting module 490 transmits the first scanning signal 492 and the second scanning signal 492 alternately. Therefore, the processing unit 480 may sense the touch behavior of the users by utilizing the at least one first receiving channel 460 and the at least one second receiving channel 470 alternately. As described above, the at least one second receiving channel 470 is a noise listening channel while the at least one first receiving channel 460 is configured to sense the touch behavior of the users. The at least one first receiving channel 460 is a noise listening channel while the second receiving channel 470 is configured to sense the touch behavior of the users. In brief, the at least one first receiving channel 460 and the at least one second receiving channel 470 are configured to sense the touch behavior of the users and to be the noise listening channel alternately.

As described above, in the embodiment of FIG. 4A, the first receiving channel 460 is configured to sense the touch behavior of the users, and the second receiving channel 470 is the noise listening channel during a positive half cycle T1 of a time period 1/R (e.g. about 1/80-1/120 second). The first receiving channel 460 is the noise listening channel, and the second receiving channel 470 is configured to sense the touch behavior of the users during the negative half cycle T2 of the time period.

In some embodiments, during the frame period, each of the corresponding data pulse signal of the display data respectively corresponds to the first scanning signal 492 (or the second scanning signal 494), and the enable duration of the first scanning signal 492 (or the second scanning signal 494) is during the enable duration of the data pulse signal. The process and the signal timing are similar to FIG. 2A, thus are not repeated herein. However, the relation between the first scanning signal 492 (or the second scanning signal 494) and the data pulse signal are not limited thereto, those skilled in the art can adjust the design according to requirements of practical applications.

Figure 5:
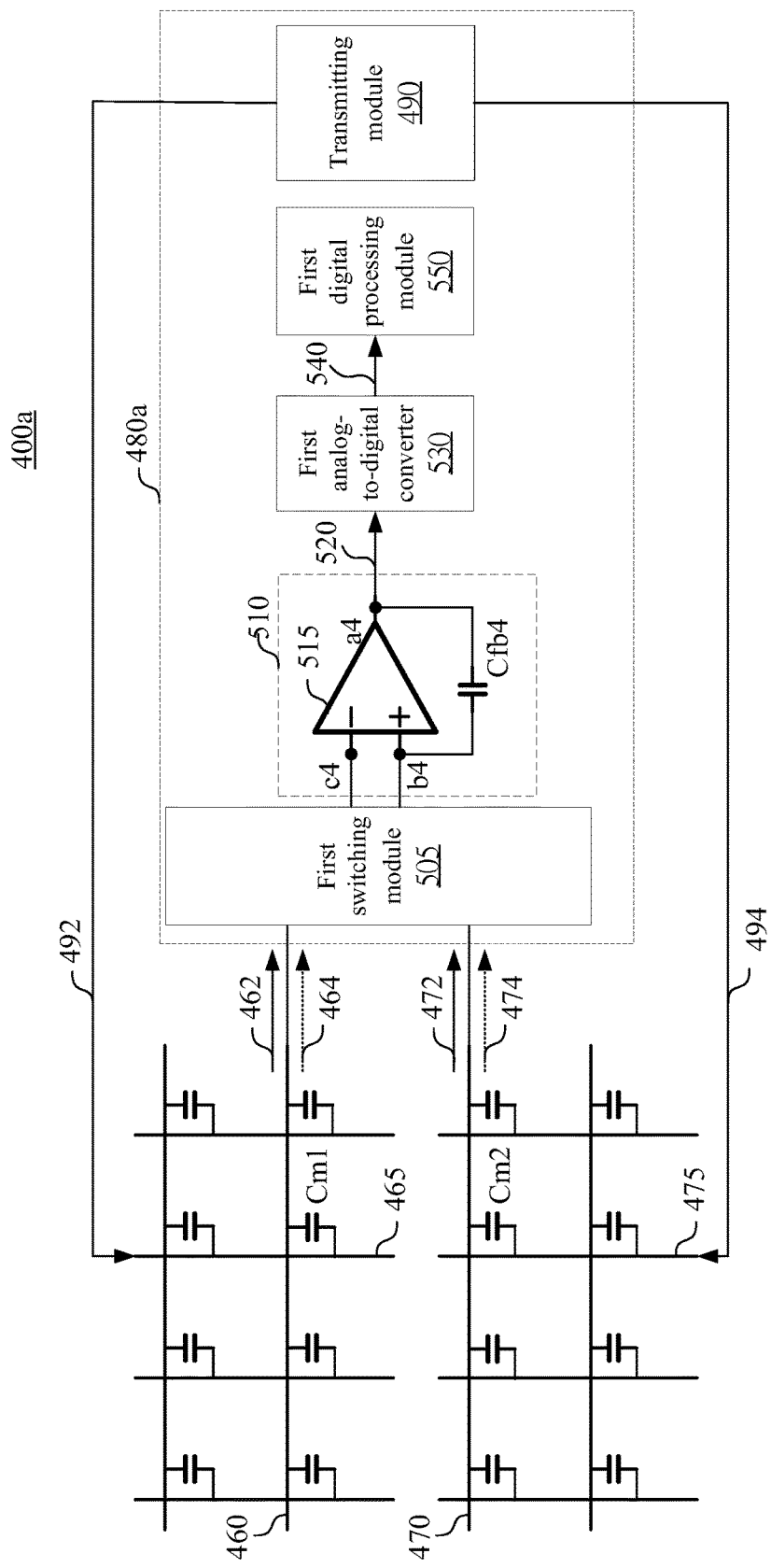
FIG. 5 is a schematic diagram illustrating a touch sensing device in accordance with one embodiment of the present disclosure.

Referring to FIG. 5, FIG. 5 is a schematic diagram illustrating a touch sensing device 400a in accordance with one embodiment of the present disclosure. Compared with the touch sensing device 400 in FIG. 4, in this embodiment, at least one processing unit 480a further includes a first receiving module 510 and a first switching module 505. In one embodiment, the first receiving module 510 and the first switching module 505 are chips. In another embodiment, the touch sensing device 400a includes at least one processor and a memory. The first receiving module 510 and the first switching module 505 are stored in the memory and executed their functions by the processor.

The first switching module 505 is electrically connected to the at least one first receiving channel 460, the at least one second receiving channel 470 and the first receiving module 510. The switching module 505 is configured to transmit the first sensing signal 462 and the second noise listening signal 474 to the first receiving module 510 during a first time duration (e.g. T1 in FIG. 4A). The switching module 505 is further configured to transmit the second sensing signal 472 and the first noise listening signal 464 to the first receiving module 510 during a second time duration (e.g. T2 in FIG. 4A). In some embodiments, a working period (e.g. 1/R in FIG. 4A) is comprised of the first time duration and the second time duration. The first time duration and the second time duration are equal. In some embodiments, the sum of the first time duration and the second time duration is about 1/80-1/120 second, in other embodiments, the sum of the first time duration and the second time duration is about 1/100 second.

In another embodiment, the first receiving module 510 outputs a first analog signal 520 according to the first sensing signal 462 and the second noise listening signal 474 during the first time duration (e.g. T1 in FIG. 4A). The first receiving module 510 outputs the first analog signal 520 according to the second sensing signal 472 and the first noise listening signal 464 during the second time duration (e.g. T2 in FIG. 4A).

In another embodiment, the first receiving module 510 subtracts the second noise listening signal 474 outputted from the at least one second receiving channel 470 from the first sensing signal 462 outputted from the first receiving channel 460 so as to output the first analog signal 520 during the first time duration (e.g. T1 in FIG. 4A). Therefore, the first receiving module 510 removes the corresponding noise component from the first sensing signal 462. The first receiving module 510 subtracts the first noise listening signal 464 outputted by the at least one first receiving channel 460 from the second sensing signal 472 outputted by the at least one second receiving channel 470 so as to output the first analog signal 520 during the second time duration (e.g. T2 in FIG. 4A). Therefore, the first receiving module 510 removes the corresponding noise component from the second sensing signal 472.

In another embodiment, the first receiving module 510 includes a first differential amplifier 515 and a first feedback capacitor Cfb4. The output a4 of the first differential amplifier 515 is electrically connected to the first terminal of the first feedback capacitor Cfb4 to output the first analog signal 520. The first input terminal b4 of the first differential amplifier 515 is electrically connected to the second terminal of the first feedback capacitor Cfb4. The first input terminal b4 of the first differential amplifier 515 receives the first sensing signal 462, and the second input terminal c4 of the first differential amplifier 515 receives the second noise listening signal 474 during the first time duration (e.g. T1 in FIG. 4A). The first input terminal b4 of the first differential amplifier 515 receives the second sensing signal 472, and the second input terminal c4 of the first differential amplifier 515 receives the first noise listening signal 464 during the second time duration (e.g. T2 in FIG. 4A).

In another embodiment, the at least one processing unit 480a further includes a first analog-to-digital converter 530 and a first digital processing module 550. In one embodiment, the first analog-to-digital converter 530 and the first digital processing module 550 are chips. In another embodiment, the touch sensing device 400a includes at least one processor and a memory. The analog-to-digital converter 530 and the first digital processing module 550 are stored in the memory and executed their function by the processor.

The first analog-to-digital converter 530 is electrically connected to the first receiving module 510. The first analog-to-digital converter 530 is configured to convert the first analog signal 520 into a first digital signal 540. The first digital processing module 550 is electrically connected to the first analog-to-digital converter 530. The first digital processing module 550 is configured to output the touch sensing data according to the first digital signal 540.

Figure 6:
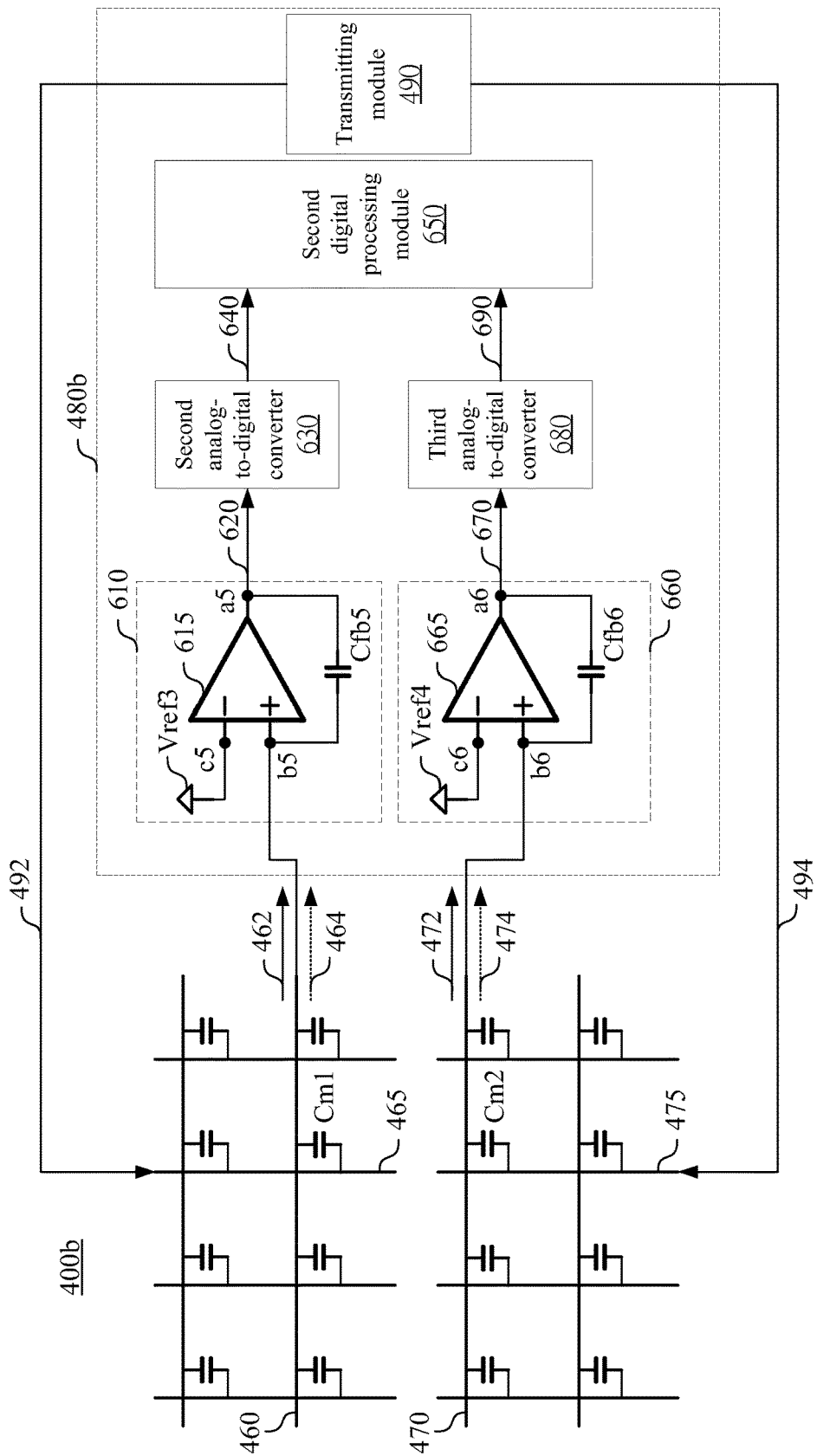
FIG. 6 is a schematic diagram illustrating a touch sensing device in accordance with one embodiment of the present disclosure.

Referring to FIG. 6, FIG. 6 is a schematic diagram illustrating a touch sensing device 400b in accordance with one embodiment of the present disclosure. Compared with the touch sensing device 400 in FIG. 4, in this embodiment, at least one processing unit 480b further includes a second receiving module 610 and a third receiving module 660.

The second receiving module 610 is electrically connected to the at least one first receiving channel 460. The second receiving module 610 is configured to output a second analog signal 620 according to the first sensing signal 462 during a first time duration (e.g. T1 in FIG. 4A) and to output the second analog signal 620 according to the first noise listening signal 464 during the second time duration (e.g. T2 in FIG. 4A). In some embodiments, a working period (e.g. 1/R in FIG. 4A) is comprised of the first time duration and the second time duration, and the first time duration and second time duration are equal. In some embodiments, the sum of the first time duration and the second time duration is about 1/80-1/120 second, in some embodiments, the sum of the first time duration and the second time duration is about 1/100 second.

The third receiving module 600 is electrically connected to the at least one second receiving channel 470. The third receiving module 660 is configured to output a third analog signal 670 according to the second noise listening signal 474 during the first time duration and to output the third analog signal 670 according to the second sensing signal 472 during the second time duration.

In one embodiment, the second receiving module 610 includes a second differential amplifier 615 and a second feedback capacitor Cfb5. The output terminal a5 of the second differential amplifier 615 is electrically connected to the first terminal of the second feedback capacitor Cfb1 to output the second analog signal 620. The first input terminal b5 of the second differential amplifier 615 is electrically connected to the second terminal of the second feedback capacitor Cfb5 and the at least one first receiving channel 460. The second input terminal c5 of the second differential amplifier 615 is electrically connected to a reference voltage Vref3. The third receiving module 660 includes a third differential amplifier 665 and a third feedback capacitor Cfb6. The output terminal a6 of the third differential amplifier 665 is electrically connected the first terminal of the third feedback capacitor Cfb6 to output the third analog signal 670. The first input terminal b6 of the third differential amplifier 665 is electrically connected to the second terminal of the third feedback capacitor and the at least one second receiving channel 470. The second input terminal c6 of the third differential amplifier 665 is electrically connected to a reference voltage source Vref4.

In another embodiment, the at least one processing unit 480b further includes a second analog-to-digital converter 630, a third analog-to-digital converter 680 and a second digital processing module 650. In one embodiment, the second analog-to-digital converter 630, the third analog-to-digital converter 680 and the second digital processing module 650 are chips. In another embodiment, the touch sensing device 400a includes at least one processor and a memory, and the second analog-to-digital converter 630, the third analog-to-digital converter 680 and the second digital processing module 650 are stored in the memory and executed their functions by the processor.

The second analog-to-digital converter 630 is electrically connected the second receiving module 610. The second analog-to-digital converter 630 is configured to convert the second analog signal 620 into a second digital signal 640. The third analog-to-digital converter 680 is electrically connected to the third receiving module 660. The third analog-to-digital converter 680 is configured to convert the third analog signal 670 into a third digital signal 690. The second digital processing module 650 is electrically connected to the second analog-to-digital converter 630 and the third analog-to-digital converter 680. The digital processing module 650 is configured to generate the touch sensing data according to the second digital signal 640 and the third digital signal 690.

In one embodiment, the second digital processing module 650 subtracts the third digital signal 690 from the second digital signal 640 so as to remove the corresponding noise component from the second digital signal 640 and to generate the touch sensing data during the first time duration, but not limited thereto. The digital processing module 650 subtracts the second digital signal 640 from the third digital signal so as to remove the corresponding noise from the third digital signal 690 and to generate the touch sensing data, but not limited thereto.

In summary, with the technique of the present invention, the effect of the noise on the linearity and the accuracy of the touch sensing function of the touch panel is reduced when the driving pixels are driven for illumination. Moreover, the receiving channels on the touch panel are configured to sense the touch behavior of users and to be the noise listening channel alternately. Therefore, the linearity and the accuracy of the touch sensing function are improved without increasing the area of the touch panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch sensing device, comprising:
    at least one receiving channel, configured to output a first sensing signal and a first noise listening signal alternately;
    at least one second receiving channel, configured to output a second sensing and a second noise listening signal alternately; and
    at least one processing unit, configured to generate touch sensing data according to the first sensing signal, the second sensing signal, the first noise listening signal and the second noise listening signal,
    wherein the first sensing signal and the second noise listening signal are sensed at a same first time duration and transmitted to the at least one processing unit during a same second time duration, and the second sensing signal and the first noise listening signal are sensed at a same third time duration and transmitted to the at least one processing unit during a same fourth time duration,
    wherein the at least one processing unit further comprises:
    a first receiving module; and
    a first switching module, electrically connected to the at least one first receiving channel, the at least one second receiving channel and the first receiving module, the first switching module configured to transmit the first sensing signal and the second noise listening signal to the first receiving module during a first time interval; the first switching module further configured to transmit the second sensing signal and the first noise listening signal to the first receiving module during a second time interval,
    wherein the first receiving module outputs a first analog signal according to the first sensing signal and the second noise listening signal during the first time interval, and the first receiving module outputs the first analog signal according to the second sensing signal and the first noise listening signal during the second time interval, and the at least one processing unit further comprises:
    a first analog-to-digital converter, electrically connected to the first receiving module, the first analog-to-digital converter configured to convert the first analog signal into a first digital signal; and
    a first digital processing module, electrically connected to the first analog-to-digital converter, the first digital processing module configured to generate the touch sensing data according to the first digital signal.

2. The touch sensing device of claim 1, further comprising:
    at least one first transmitting channel;
    at least one second transmitting channel;
    at least one first coupling capacitor; and
    at least one second coupling capacitor;
    wherein the at least one first transmitting channel is electrically connected to the at least one first receiving channel via the at least one first coupling capacitor, and the at least one second transmitting channel is electrically connected to the at least one second receiving channel via the at least one second coupling capacitor.

3. The touch sensing device of claim 2, wherein the at least one transmitting channel and the at least one second transmitting channel are spatially separated.

4. The touch sensing device of claim 2, wherein the at least one processing unit further comprises a transmitting module, the transmitting module is configured to transmit a first scanning signal to the at least one first transmitting channel, the at least one first receiving channel outputs the first sensing signal to the processing unit after the first scanning signal coupled to the at least one first coupling capacitor; and the transmitting module is further configured to transmit a second scanning signal to the at least one second transmitting channel, the at least one second receiving channel outputs the second sensing signal to the at least one processing unit after the second scanning signal coupled to the at least one second coupling capacitor.

5. The touch sensing device of claim 4, wherein the transmitting module transmits the first scanning signal and the second scanning signal alternately.

6. The touch sensing device of claim 1, wherein the first receiving module comprises a first differential amplifier and a first feedback capacitor, a output terminal of the first differential amplifier is electrically connected to a first terminal of the first feedback capacitor to output the first analog signal, a first input terminal of the first differential is electrically connected to a second terminal of the first feedback capacitor; the first input terminal of the first differential amplifier receives the first sensing signal, a second input terminal of the first differential amplifier receives the second noise listening signal during the first time interval; the first input terminal of the first differential amplifier receives the second sensing signal, the second input terminal of the first differential amplifier receives the first noise listening signal during the second time interval.

7. The touch sensing device of claim 1, wherein the at least one processing unit further comprises:

a second receiving module, electrically connected to the at least one first receiving channel, the second receiving module configured to output a second analog signal according to the first sensing signal during a first time interval, and to output the second analog signal according to the first noise listening signal during a second time interval; and a third receiving module, electrically connected to the at least one second receiving channel, the third receiving module configured to output a third analog signal according to the second noise listening signal during the first time interval, and to output the third analog signal according to the second sensing signal during the second time interval.

8. The touch sensing device of claim 1, wherein the at least one processing unit further comprises:

a second analog-to-digital converter, electrically connected to the second receiving module, the second analog-to-digital converter configured to convert the second analog signal into a second digital signal;

a third analog-to-digital converter, electrically connected to the third receiving module, the third receiving module configured to convert the third analog signal into a third digital signal; and a second digital processing module, electrically connected to the second analog-to-digital converter and the third analog-to-digital converter, the second digital processing module configured to generate the touch sensing data according to the second digital signal and the third digital signal.

* * * * *